(12) United States Patent
Uno

(10) Patent No.: US 8,701,812 B2
(45) Date of Patent: Apr. 22, 2014

(54) TOWING TRACTOR

(75) Inventor: Seiji Uno, Aichi-ken (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 262 days.

(21) Appl. No.: 12/939,428

(22) Filed: Nov. 4, 2010

(65) Prior Publication Data

US 2011/0108338 A1 May 12, 2011

(30) Foreign Application Priority Data

Nov. 6, 2009 (JP) ................................. 2009-255415

(51) Int. Cl.
*B62D 25/12* (2006.01)

(52) U.S. Cl.
USPC .................... 180/89.1; 180/65.1; 296/193.11; 296/181.1; 296/180.1; 296/180.2

(58) Field of Classification Search
USPC .................. 180/65.1, 89.1; 296/180.1, 180.2, 296/181.1, 181.5; D12/14
See application file for complete search history.

(56) References Cited

U.S. PATENT DOCUMENTS

| | | | | | |
|---|---|---|---|---|---|
| 2,012,591 | A | * | 8/1935 | Sewall | 296/91 |
| 2,184,798 | A | * | 12/1939 | Gracey | 296/91 |
| 2,711,341 | A | * | 6/1955 | Mills et al. | 296/203.01 |
| D282,153 | S | * | 1/1986 | Wallace et al. | D12/14 |
| 4,662,472 | A | | 5/1987 | Christianson et al. | |
| 4,946,193 | A | * | 8/1990 | Oka | 280/769 |
| D311,505 | S | * | 10/1990 | Reinhart | D12/14 |
| D312,227 | S | * | 11/1990 | Miyamoto et al. | D12/14 |
| 5,011,217 | A | * | 4/1991 | Simpson et al. | 296/203.01 |
| D325,183 | S | * | 4/1992 | Nishikawa et al. | D12/14 |
| 5,630,640 | A | * | 5/1997 | Fior | 296/91 |
| 5,924,756 | A | * | 7/1999 | Homa | 296/91 |
| 6,030,029 | A | * | 2/2000 | Tsuda et al. | 296/203.02 |
| D439,549 | S | * | 3/2001 | Shambeau et al. | D12/14 |
| D463,326 | S | * | 9/2002 | Takeda | D12/14 |
| D511,715 | S | * | 11/2005 | Hohnl et al. | D12/14 |
| 2002/0017407 | A1 | * | 2/2002 | Takeda | 180/68.5 |
| 2008/0006465 | A1 | * | 1/2008 | Xie | 180/252 |
| 2008/0308334 | A1 | * | 12/2008 | Leonard et al. | 180/89.1 |

FOREIGN PATENT DOCUMENTS

| | | |
|---|---|---|
| DE | 2063320 A1 | 7/1972 |
| DE | 9114302 U1 | 4/1992 |
| DE | 4137282 A1 | 5/1993 |
| JP | 2270635 A | 11/1990 |
| JP | 06-171378 A | 6/1994 |
| JP | 10-250482 A | 9/1998 |

OTHER PUBLICATIONS

Volk Corporate News: Test driving—VOLK Electric Tow Tractors in the Kogel trailer test hall, Mar. 30, 2009, pp. 3 and 4.*

(Continued)

*Primary Examiner* — J. Allen Shriver, II
*Assistant Examiner* — Steve Clemmons
(74) *Attorney, Agent, or Firm* — Sughrue Mion, PLLC

(57) ABSTRACT

A towing tractor includes an operator's cockpit, a battery, a hood, a first inclined surface, a first inclined surface and a second inclined surface. The battery is disposed forward of the operator's cockpit. The hood covers the top of the battery. The first inclined surface is formed on the hood and inclined downwardly toward the front of the towing tractor. The second inclined surface is located forward of the first inclined surface and inclined downwardly toward the front of the towing tractor. The inclination angle of the second inclined surface is greater than the inclination angle of the first inclined surface.

6 Claims, 4 Drawing Sheets

(56) References Cited

OTHER PUBLICATIONS

Examination Report of Australian Patent Application 2010236034, dated Jun. 1, 2011.

German Office Action received Jan. 21, 2013 for German Patent Application No. 10 2010 043 505.8.

* cited by examiner

TOWING TRACTOR

BACKGROUND OF THE INVENTION

The present invention relates to a towing tractor having a battery forward of the operator's seat and a hood covering the battery from above.

This type of towing tractor is disclosed in Japanese Patent Application Publication No. 6-171378. The towing tractor according to the above Publication has a battery behind the operator's cockpit. The towing tractor has a drawbar device at the rear end thereof. The distance from the operator's cockpit to the drawbar device is made longer by providing the battery behind the operator's cockpit. As a result, the length of the linkage between the drawbar operating lever and he drawbar is increased, so that the degrees of freedom in arrangement of the drawbar operating lever and the linkage is decreased. This makes it difficult to arrange the drawbar operating lever and the linkage in the towing tractor.

If the battery is provided forward of the operator's cockpit, the above-described difficulty may be solved.

However, if the battery is provided forward the operator's cockpit, the distance from the operator's cockpit to the front end of the towing tractor is longer, so that the front lower view from the operator's cockpit is disadvantageously narrowed.

The present invention is directed to preventing the narrowing of the front lower view from an operator's cockpit in a towing tractor having a battery forward of the operator's cockpit.

SUMMARY OF THE INVENTION

In accordance with the present invention, a towing tractor includes an operator's cockpit, a battery, a hood, a first inclined surface, a first inclined surface and a second inclined surface. The battery is disposed forward of the operator's cockpit. The hood covers the top of the battery. The first inclined surface is formed on the hood and inclined downwardly toward the front of the towing tractor. The second inclined surface is located forward of the first inclined surface and inclined downwardly toward the front of the towing tractor. The inclination angle of the second inclined surface is greater than the inclination angle of the first inclined surface.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the presently preferred embodiments together with the accompanying drawings in which.

DETAILED DESCRIPTION OF THE PREFERRED EMBODIMENTS

Figure 1A:
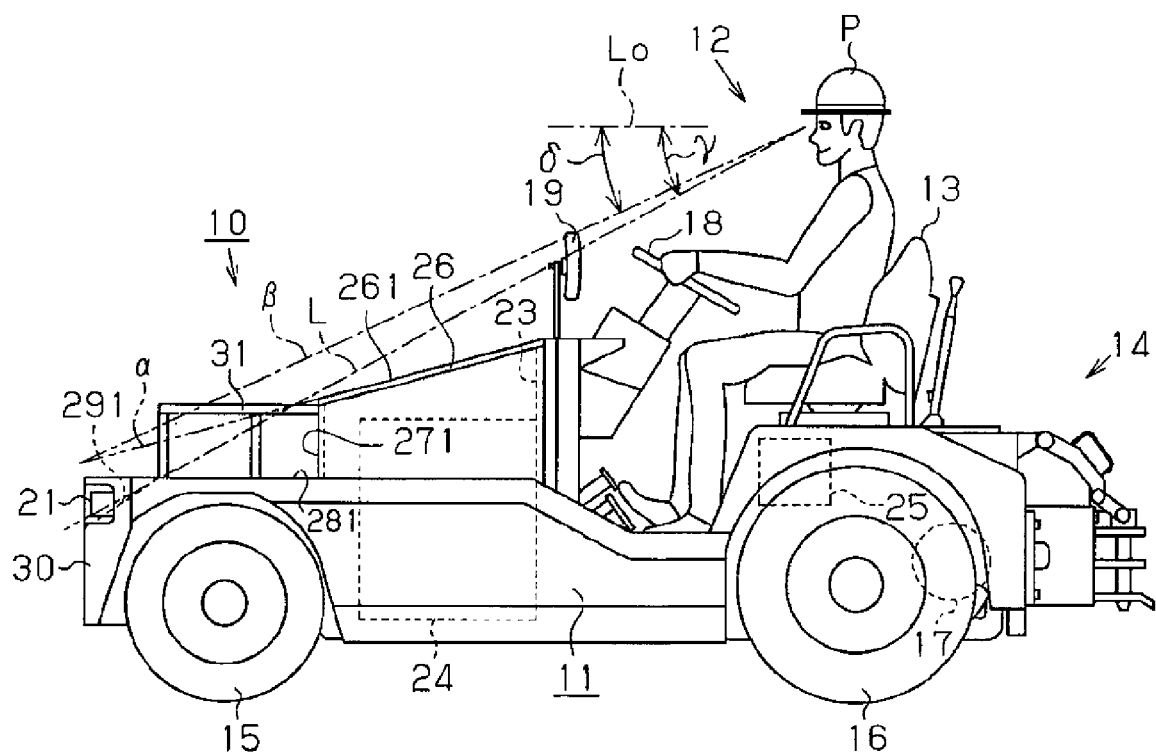
FIG. 1A is a side view of a towing tractor according to a first preferred embodiment of the present invention.
Figure 1B:
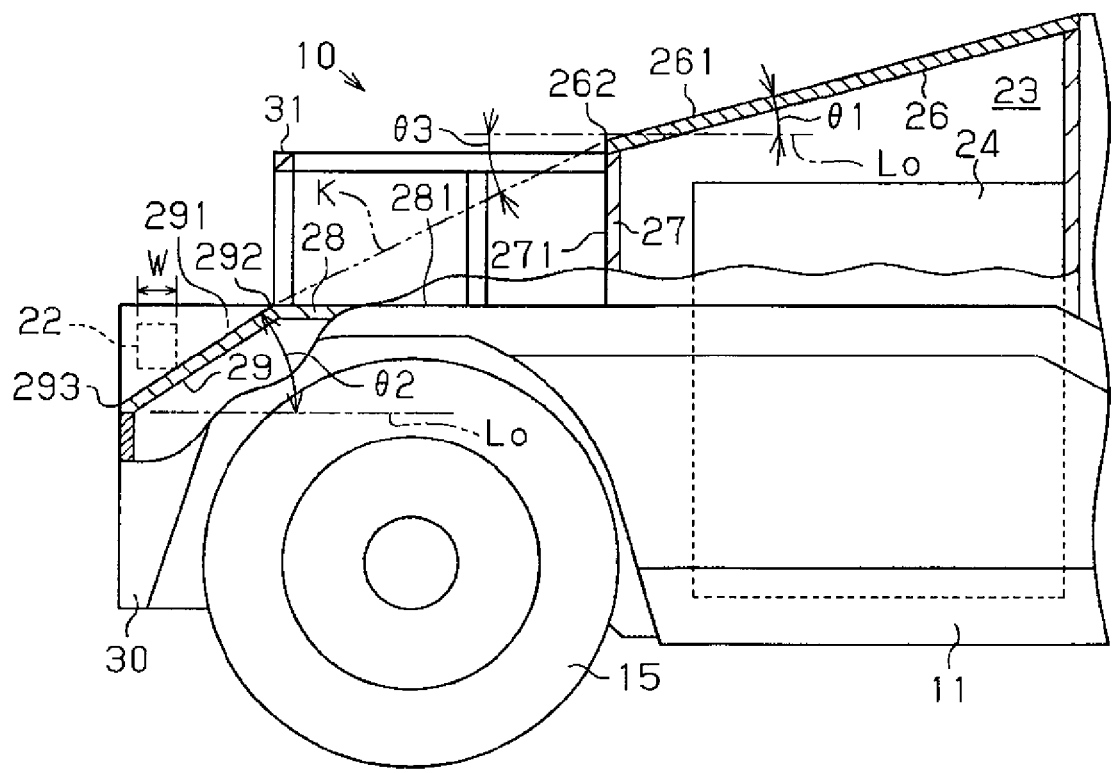
FIG. 1B is an enlarged fragmentary sectional view of the towing tractor of FIG. 1.
Figure 2:
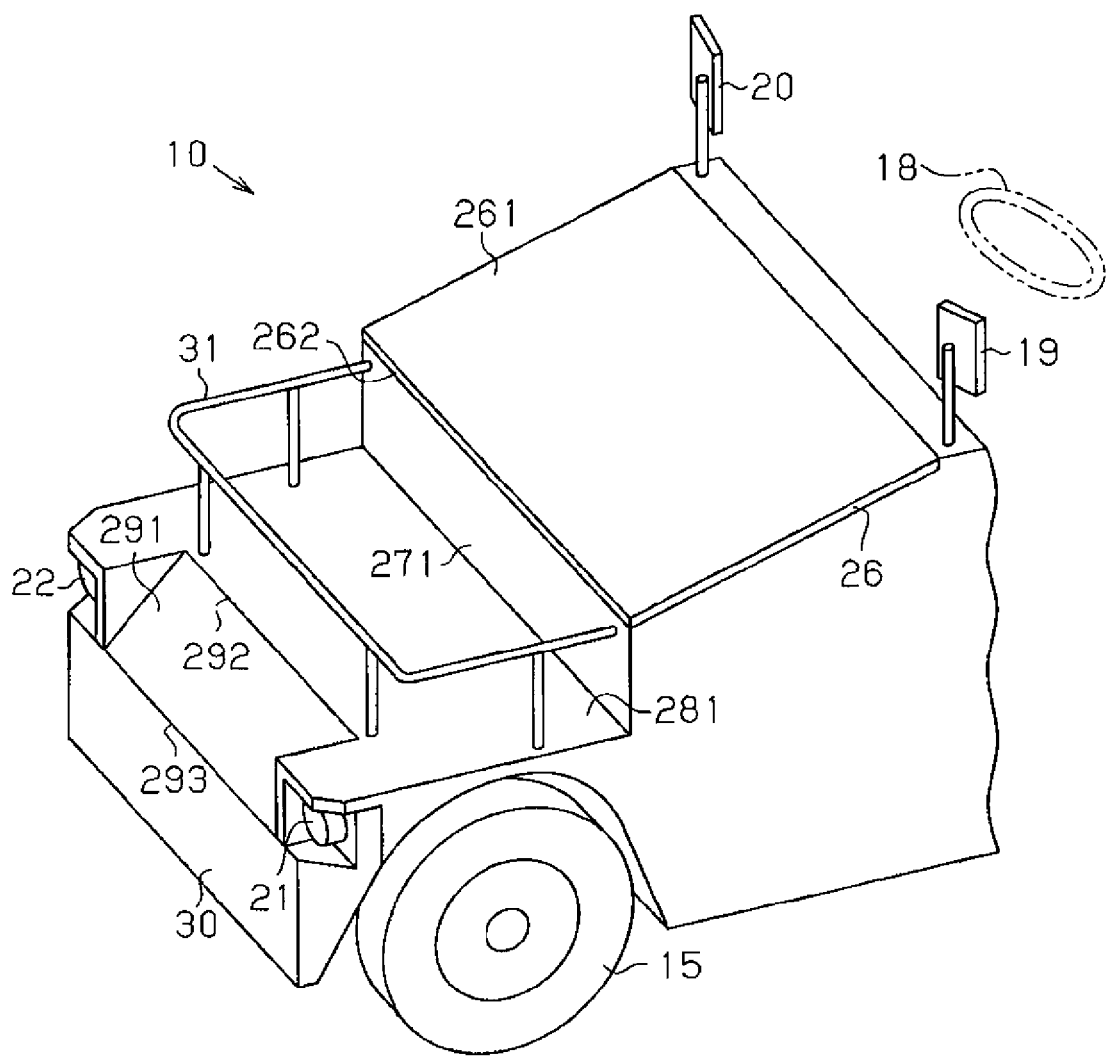
FIG. 2 is a fragmentary perspective view of the towing tractor of FIG. 1.

The following will describe a towing tractor according to a first preferred embodiment of the present invention with reference to FIGS. 1, 2. Referring to FIG. 1A, the towing tractor 10 includes a body 11. In the following description, the front of the towing tractor 10 is the leading side of the towing tractor 10 when traveling forward and the rear is the opposite traveling side of the towing tractor 10. An operator's cockpit 12 is provided in the rear part of the body 11 of the towing tractor 10. The operator's cockpit 12 has a seat 13. A drawbar device 14 is provided at the rear end of the body 11.

The towing tractor 10 has a pair of front wheels 15 on the front lower part of the body 11 and a pair of rear wheels 16 on the rear lower part of the body 11. A driving motor 17 is provided in the rear part of the body 11 for driving the rear wheels 16. A steering wheel 18 is provided forward of the seat 13 or located in the operator's cockpit 12. The driving motor 17 is located rearward of the steering wheel 18.

Referring to FIG. 2, side mirrors 19, 20 are provided in the towing tractor 10 at positions forward of the steering wheel 18 (or forward of the operator's cockpit 12 shown in FIG. 1) and on the right and left sides of the steering wheel 18. The side mirrors 19, 20 are rear-view mirrors. A pair of left and right headlights 21, 22 are provided at the front end of the body 11.

As shown in FIG. 1A, a battery compartment 23 is provided in the front part of the body 11 (or at a position forward of the operator's cockpit 12). The battery compartment 23 accommodates therein a battery 24. The driving motor 17 of the towing tractor 10 is driven by electric power from the battery 24. A controller 25 is provided in the towing tractor 10 on the lower side of the seat 13 for controlling the operation of the driving motor 17. The controller 25 is located rearward of the steering wheel 18.

A hood 26 having a plate-like shape is detachably provided to cover the top of the battery compartment 23. The hood 26 is inclined downwardly toward the front of the towing tractor 10. The top surface of the hood 26 forms a first inclined surface 261 inclining downwardly toward the front of the towing tractor 10. Most of the width of the first inclined surface 261 as measured across the towing tractor 10 is within the distance between the side mirrors 19, 20, or the width of the first inclined surface 261 is greater than the distance between the side mirrors 19, 20.

Referring to FIG. 1B, the battery compartment 23 has an upright front wall 27, and the front end of the hood 26 is on the top of the front wall 27. The front wall 27 has a front surface 271. There is provided a top wall 28 forward of the front wall 27. The top wall 28 has a horizontal plane mounting surface 281 which is connected to the front surface 271 of the front wall 27 at a vertical middle position and the top surface of the top wall 28 is formed to extend from the mounting surface 281 to the front end thereof.

An inclined wall 29 is formed forward of the top wall 28 so as to extend continuously from the front end of the top wall 28, and the top surface of the inclined wall 29 forms a second inclined surface 291 having a plane shape inclined downwardly toward the front of the towing tractor 10. The first inclined surface 261 and the second inclined surface 291 are spaced apart from each other in the longitudinal direction of the towing tractor 10 with the mounting surface 281 interposed therebetween. In other word, the mounting surface 281 is provided between the first inclined surface 261 and the second inclined surface 291.

The mounting surface 281 is located below a straight imaginary line K defined by connecting the lowermost part of the first inclined surface 261 (or the front edge 262 of the first inclined surface 261) and the uppermost part of the second inclined surface 291 (or the rear edge 292 of the second inclined surface 291). Thus, the second inclined surface 291 is disposed lower than the first inclined surface 261. As most clearly seen in FIG. 2, a fence 31 is provided surrounding the front and opposite lateral sides of the mounting surface 281.

The inclination angle of the second inclined surface 291 is greater than that of the first inclined surface 261. Angle $\theta 2$ shown in FIG. 1B represents the inclination angle of the second inclined surface 291 that is formed between the plane of the second inclined surface 291 and an imaginary horizontal plane Lo shown in FIG. 1B. Angle $\theta 1$ shown in FIG. 1B represents the inclination angle of the first inclined surface 261 formed between the plane of the first inclined surface 261 and an imaginary horizontal plane Lo shown in FIG. 1B.

Angle $\theta 3$ in FIG. 1B represents the inclination angle of the imaginary line K connecting the front edge 262 of the first inclined surface 261 and the rear edge 292 of the second inclined surface 291, or the angle formed between the imaginary line K and the horizontal plane Lo. The inclination angle $\theta 3$ is greater than the inclination angle $\theta 1$, and the inclination angle $\theta 2$ is greater than the inclination angle $\theta 3$.

A bumper 30 is provided at the front end of the inclined wall 29. A pair of the left and right headlights 21, 22 is mounted in the bumper 30. The paired left and right headlights 21, 22 are located at the same position in the left-and-right direction (or the width direction of the towing tractor 10). The second inclined surface 291 is positioned on the right side of the left headlight 21 and on the left side of the right headlight 22. The front edge 293 of the second inclined surface 291 is located forward of the paired left and right headlights 21, 22. Symbol W shown in FIG. 1B represents the length of the left and right headlights 21, 22 as measured in the longitudinal direction of the towing tractor 10. Thus, the front edge 293 of the second inclined surface 291 is located more forward than the range of the length W of the paired left and right headlights 21, 22 as measured in the longitudinal direction of the towing tractor 10. A part of the bumper 30 positioned within the width of the second inclined surface 291 is located below the front edge 293 of the second inclined surface 291.

Operator P seated on the seat 13 operates the towing tractor 10 while looking forward, left and right, looking at the left and right side mirrors 19, 20 or looking backward. An imaginary line L shown in FIG. 1A is an example of line of sight of the operator P while looking forward. The imaginary line L shows the lowermost line of sight of the operator P while looking downwardly forward.

The following advantageous effects are obtained according to the first preferred embodiment of the present invention.
(1) Supposing that the first inclined surface 261 is formed to extend to the front end of the towing tractor 10, the inclined imaginary line α shown by the double-dashed line of FIG. 1A is defined. That is, the imaginary line α is an extension from a line extending along the first inclined surface 261 in the longitudinal direction of the towing tractor 10. Supposing that a surface defined by the inclined imaginary line α is present, the dashed line β represents the lowermost line of sight of the operator P viewing downwardly toward the front end of the towing tractor 10.

Depression angle γ of the sight line L when the second inclined surface 291 is present as in the illustrated embodiment is greater than the depression angle δ when the second inclined surface 291 is absent and the surface defined by the inclined imaginary line α is present. Thus, in the towing tractor 10 of the present embodiment wherein the second inclined surface 291 having the inclination angle $\theta 2$ that is greater than the inclination angle $\theta 1$ of the first inclined surface 261 is provided forward of the first inclined surface 261, the front lower view from the operator's cockpit 12 becomes wider as compared to a case of a towing tractor having only one surface inclined toward the front end of the towing tractor such as 261. This prevents the narrowing of the front lower view from the operator's cockpit 12 when the battery 24 is provided forward of the operator's cockpit 12 in the towing tractor 10.

(2) Since the inclination angle $\theta 3$ of the imaginary line K is greater than the inclination angle $\theta 1$ of the first inclined surface 261, the front lower view from the operator's cockpit 12 is wider as compared to a case where the first inclined surface 261 extends to the position where the rear edge 292 of the second inclined surface 291 is located.

Since the inclination angle $\theta 2$ of the second inclined surface 291 is greater than the inclination angle $\theta 3$ of the imaginary line K, the front lower view from the operator's cockpit 12 is wider as compared to a case where the second inclined surface 291 is made along the imaginary line K, or a case where the second inclined surface 291 is made the same as the inclination angle $\theta 3$ and the imaginary line K is made starting from the rear edge 292 of the second inclined surface 291.

Thus, in the towing tractor 10 wherein the inclination angle $\theta 3$ of the imaginary line K is greater than the inclination angle $\theta 1$ of the first inclined surface 261 and the inclination angle $\theta 2$ of the second inclined surface 291 is greater than the inclination angle $\theta 3$ of the imaginary line K, narrowing of the view from the operator's cockpit due to a battery mounted in front of the operator's cockpit 12 is prevented.

(3) Since the battery-powered towing tractor 10 has no important devices such as a radiator used in a vehicle powered by an internal combustion engine between the left and right headlights 21, 22 at the front part of the body 11, the top surface of the front part of the body 11 between the left and right headlights 21, 22 may have a concaved shape. Thus, the top surface of the front part of the body 11 on the right side of the left headlight 21 and the left side of the right headlight 22 is suitable for forming the second inclined surface 291.

(4) The horizontal mounting surface 281 is formed below the imaginary line connecting between the lowermost part of the first inclined surface 261 (or the front edge 262 of the first inclined surface 261) and the uppermost part of the second inclined surface 291 (the rear edge 292 of the second inclined surface 291). Thus, a load may be placed on the mounting surface 281 without blocking the front lower view from the operator's cockpit 12.

(5) In the towing tractor 10 having the driving motor 17 and the controller 25 provided rearward of the steering wheel 18, the length of the towing tractor 10 frontward of the operator's cockpit 12 is smaller as compared to a case where the driving motor 17 and the controller 25 are provided forward of the operator's cockpit 12, which is advantageous for expanding the front lower view from the operator's cockpit 12.

Figure 3:
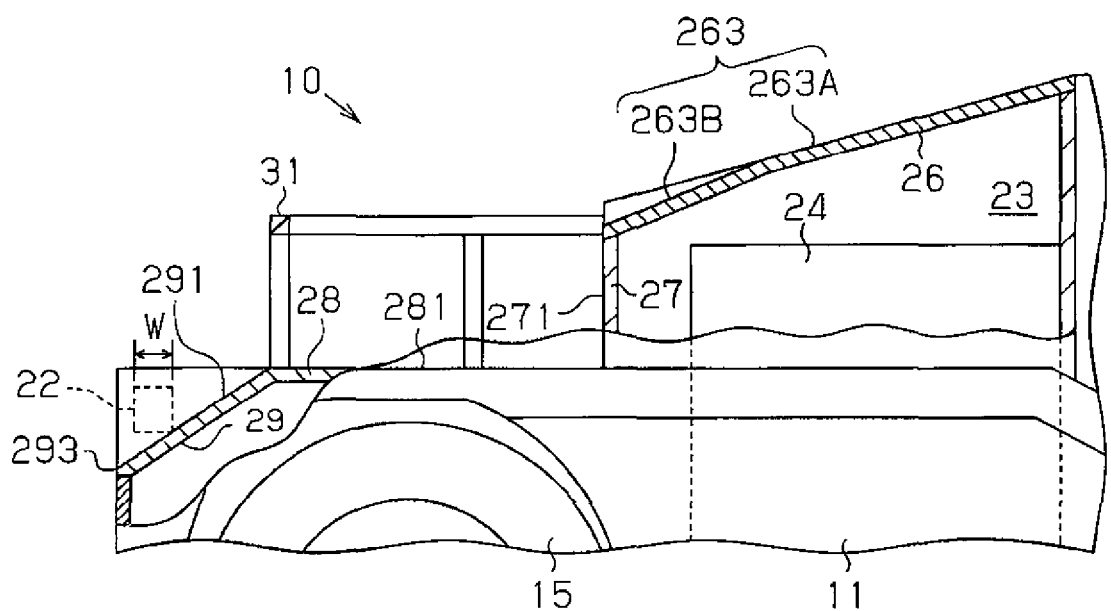
FIG. 3 is a fragmentary sectional view of a towing tractor according to a second preferred embodiment of the present invention.

The following will describe a second preferred embodiment of the present invention with reference to FIG. 3. Same reference numerals are used for the common elements or components in the first and second embodiments, and the description of such elements or components for the second embodiment will be omitted.

According to the second preferred embodiment of the present invention, the top of the hood 26 is formed by a rear inclined surface portion 263A having a plane shape and a front inclined surface portion 263B also having a plane shape and a greater inclination angle than the rear inclined surface portion 263A. The rear and front inclined surface portions 263A and 263B form the first inclined surface 263 of the hood 26. The inclination angle of the second inclined surface 291 is greater than the inclination angle of the front inclined surface portion 263B of the first inclined surface 263.

According to the second preferred embodiment, the same advantageous effects as those of the first preferred embodiment are obtained. The present invention is not limited to the embodiments described above, but it may be modified in various ways as exemplified by the following alternative embodiments.

The front edge 293 of the second inclined surface 291 may be located within range of the length W of the paired left and right headlights 21, 22 as measured in the longitudinal direction of the towing tractor 10.

The inclination angle θ3 of the imaginary line K may be the same as the inclination angle θ1 of the first inclined surface 261.

The inclination angle θ3 of the imaginary line K may be greater than the inclination angle θ1 of the first inclined surface 261, and the inclination angle θ2 of the second inclined surface 291 may be the same as the inclination angle θ1 of the first inclined surface 261.

The first inclined surface may be formed to have a convex curved surface, or the second inclined surface may be formed similarly to have a convex curved surface.

In this case, the inclination angles of the respective first and second inclined surfaces are determined based on the lines that are tangential to the convex curved surfaces as seen in the longitudinal direction of the towing tractor 10, and any inclination angle of the second inclined surface is greater than the inclination angle of the first inclined surface.

The first inclined surface may be formed by a bent surface having more than two plane surfaces which are connected continuously with one another.

The second inclined surface may be formed by a bent surface having a plurality of plane surfaces which are connected continuously with one another.

The first and the second inclined surfaces may be connected continuously to each other directly.

The hood may be undetachably mounted to the battery compartment.

What is claimed is:

1. A towing tractor including a front wheel comprising:
an operator's cockpit;
a battery disposed forward of the operator's cockpit;
a battery compartment provided between the operator's cockpit and the front wheel, the battery compartment accommodating the battery in the battery compartment;
a hood covering the battery compartment;
a first inclined surface formed on the hood and inclined downwardly toward the front of the towing tractor;
a body in which the battery is provided; and
a second inclined surface having a planar shape formed on the body, located forward of the first inclined surface and the front wheel and inclined downwardly toward the front of the towing tractor, the inclination angle of the second inclined surface is greater than the inclination angle of the first inclined surface,
wherein the first inclined surface and the second inclined surface are spaced apart from each other in the longitudinal direction of the towing tractor with a space located above the front wheel and interposed between the first inclined surface and the second inclined surface, the second inclined surface is disposed lower than the first inclined surface, an imaginary line is defined by connecting the front edge of the first inclined surface and the rear edge of the second inclined surface, the inclination angle of the imaginary line is the same as or greater than the inclination angle of the first inclined surface, and the inclination angle of the second inclined surface is greater than the inclination angle of the imaginary line,
wherein the towing tractor has left and right headlights located forward of the operator's cockpit, the second inclined surface is located on the fight side of the left headlight and on the left side of the right headlight, so that the planar shape of the second inclined surface extends between the right headlight and the left headlight,
the front edge of the second inclined surface is disposed more forward than the range of the length of the paired left and right headlights as measured in the longitudinal direction of the towing tractor and lower than the top surface of the left and fight headlights, and
the rear edge of the second inclined surface is disposed more rearward than the range of the length of the paired left and right headlights as measured in the longitudinal direction of the towing tractor.

2. The towing tractor according to claim 1, wherein the towing tractor includes a mounting surface having a horizontal plane surface which is located between the first inclined surface and the second inclined surface and below the imaginary line.

3. The towing tractor according to claim 1, wherein the top surface of the first inclined surface has a plane shape or a convex curved shape, the top surface of the second inclined surface has a plane shape or a convex curved shape, and any inclination angles of the second inclined surface determined based on the lines tangential to the top surface of the second inclined surface as seen in the longitudinal direction of the towing tractor is greater than any inclination angles of the first inclined surface determined based on the lines tangential to the top surface of the first inclined surface.

4. The towing tractor according to claim 1, wherein the first inclined surface has a front inclined surface portion and a rear inclined surface portion, the front inclined surface portion is positioned forward of the rear inclined surface portion, the inclination angle of the front inclined surface portion is greater than the rear inclined surface portion and the inclination angle of the second inclined surface is greater than the inclination angle of the front inclined surface portion.

5. The towing tractor according to claim 1, wherein the towing tractor has a steering wheel being located in the operator's cockpit, a driving motor and a controller being respectively located rearward of the steering wheel.

6. A towing tractor comprising:
an operator's cockpit;
a battery disposed forward of the operator's cockpit;
a hood covering the top of the battery;
a first inclined surface formed on the hood and inclined downwardly toward the front of the towing tractor;
a body in which the battery is provided; and
a second inclined surface formed on the body and located forward of the first inclined surface and inclined downwardly toward the front of the towing tractor, the inclination angle of the second inclined surface is the same as the inclination angle of the first inclined surface and smaller than the inclination angle of an imaginary line connecting the front edge of the first inclined surface and the rear edge of the second inclined surface.

* * * * *